United States Patent

Kimura et al.

[11] Patent Number: 6,062,021
[45] Date of Patent: *May 16, 2000

[54] FLUID COUPLING

[75] Inventors: Katsumi Kimura, Kawasaki; Kazuhiko Sugiyama, Fujisawa; Kazuo Hattori, Yokosuka; Michio Otsuka; Hiroshi Ogata, both of Yokohama, all of Japan

[73] Assignee: Ebara Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/997,806

[22] Filed: Dec. 24, 1997

[30] Foreign Application Priority Data

Dec. 27, 1996 [JP] Japan ................................. 8-358235

[51] Int. Cl.$^7$ ...................................................... F16D 33/00
[52] U.S. Cl. .............................................. 60/330; 60/331
[58] Field of Search ..................... 60/330, 331; 415/200, 415/358; 416/241 R

[56] References Cited

U.S. PATENT DOCUMENTS

| | | | |
|---|---|---|---|
| 3,919,844 | 11/1975 | Elderton | 60/330 |
| 4,273,512 | 6/1981 | Weiler | 416/188 |
| 4,608,823 | 9/1986 | Maze | 60/361 |
| 4,641,549 | 2/1987 | Muller | 74/732 |
| 4,671,061 | 6/1987 | Elderton | 60/351 |
| 4,726,185 | 2/1988 | Shigemasa et al. | 60/361 |
| 4,949,821 | 8/1990 | Murota et al. | 60/339 X |
| 5,431,536 | 7/1995 | By et al. | 415/200 |
| 5,431,752 | 7/1995 | Brogle et al. | 148/516 |
| 5,518,368 | 5/1996 | Egert | 416/180 |
| 5,822,987 | 10/1998 | Tsukamoto et al. | 60/345 X |

FOREIGN PATENT DOCUMENTS

| | | |
|---|---|---|
| 2 386 742 | 11/1978 | France . |
| 43 38 475 A1 | 11/1995 | Germany . |
| 21 59 252 | 11/1985 | United Kingdom . |

*Primary Examiner*—Hoang Nguyen
*Attorney, Agent, or Firm*—Armstrong, Westerman, Hattori, McLeland & Naughton

[57] ABSTRACT

A fluid coupling includes an input shaft having a speed-increasing gear train, an impeller operatively connected to the input shaft, an impeller casing fixed to the impeller, and an output shaft having a runner operatively combined with the impeller. The impeller, the runner and the impeller casing jointly define a working fluid chamber. The impeller casing and the impeller are made of a material having a small specific gravity and a high allowable stress range for reducing centrifugal stresses developed therein when the impeller casing rotates at high speeds. The material may be a titanium alloy or an aluminum alloy.

4 Claims, 2 Drawing Sheets

FLUID COUPLING

BACKGROUND OF THE INVENTION

1. Field of the Invention

The present invention relates to a fluid coupling, and more particularly to a fluid coupling which is used for controlling rotational speeds of a boiler feed pump, a descaling pump or the like in a thermal power plant, an iron production plant or the like, and is operable at high speeds.

2. Description of the Prior Art

Recently, there have been demands for variable speed regulators for operating high-speed, large-capacity pumps and blowers with high efficiency as energy saving apparatus for use with rotary machinery. To meet such demands, there has been developed a fluid coupling assembly which comprises speed-increasing gear trains and a variable-speed fluid coupling which are integrally housed in a casing, the variable-speed fluid coupling having an impeller runner assembly mounted on a high-speed shaft of the speed-increasing gear train.

FIG. 2 of the accompanying drawings shows a conventional fluid coupling. As shown in FIG. 2, the conventional fluid coupling has an input shaft 21 with a large gear 22 mounted thereon, and a drive shaft 23 disposed parallel to the input shaft 21 and supporting a small gear 24 held in mesh with the large gear 22. The large gear 22 and the small gear 24 which are held in mesh with each other jointly serve as a speed-increasing gear train for increasing the rotational speed of the drive shaft 23 as compared with the rotational speed of the input shaft 21. The conventional fluid coupling also has a driven shaft 25 disposed adjacent to and coaxially with the drive shaft 23.

An impeller 26 is coupled to an inner end of the drive shaft 23, and a runner 27 is coupled to an inner end of the driven shaft 25. The impeller 26 is fixed to an impeller casing 28 which houses the runner 27 therein. The impeller 26, the runner 27 and the impeller casing 28 jointly define a working fluid chamber with a scoop tube 30 disposed therein for continuously varying the rotational speed of a load such as a pump coupled to the fluid coupling from a minimum speed level to a maximum speed level.

A large gear 31 is mounted on the driven shaft 25 and held in mesh with a small gear 33 mounted on an output shaft 32 which extends parallel to the driven shaft 25. The large gear 31 and the small gear 33 also jointly serve as a speed-increasing gear train for increasing the rotational speed of the output shaft 32 as compared with the rotational speed of the driven shaft 25.

Auxiliary machines such as a main oil pump 36 and an auxiliary oil pump (not shown) are connected to the input shaft 21 through gears 35. The main oil pump 36 axially extends in a direction normal to the sheet of FIG. 1.

If the rotational speed of the load such as the pump is high so as to be in the range of 7,000 to 10,000 rpm, the conventional fluid coupling meets such a high speed requirement by increasing the rotational speed with the two speed-increasing gear trains, positioned respectively on input and output sides of the impeller 26 and the runner 27, such that the peripheral speeds of effective-diameter portions of the impeller 26 and the runner 27 will not exceed a certain reference value which normally ranges from about 150 m/s to 165 m/s.

Since the peripheral speeds of effective-diameter portions of the impeller 26 and the runner 27 will not exceed a certain reference value which normally ranges from about 150 to 165 m/s, the impeller 26, the runner 27 and the impeller casing 28 are protected from fracture or fatigue-induced fracture due to various stresses including centrifugal stresses developed in the impeller 26, the runner 27 and the impeller casing 28 when power is transmitted thereto, stresses and thermal stresses developed by a centrifugal hydraulic pressure in the working fluid chamber, and stresses caused when torque is transmitted. Since outer circumferential open ends of the impeller 26 and the impeller casing 28 are of an overhanging and cantilevered structure, the peripheral speeds of the impeller 26 and the impeller casing 28 are suppressed because their outer circumferential open ends are most subject to fatigue-induced fracture. For the above reasons, the two speed-increasing gear trains are disposed respectively on the input and output sides of the impeller 26 and the runner 27 to meet rotational speed requirements of the load such as a pump.

The two speed-increasing gear trains, however, have suffered various disadvantages in that the fluid coupling is large in overall size and weight, takes up a large installation space, and is highly costly to manufacture.

SUMMARY OF THE INVENTION

It is therefore an object of the present invention to provide a fluid coupling which has an impeller and a runner that are rotatable at high speeds to allow an output shaft to rotate at high speeds in the range of 7,000 to 10,000 rpm through a single speed-increasing gear train.

To achieve the above object, according to the present invention, there is provided a fluid coupling comprising: an input shaft having a speed-increasing gear train; a working fluid chamber defined by an impeller, a runner and an impeller casing; an output shaft having the runner operatively combined with the impeller; the impeller casing being made of a material having a small specific gravity and a high allowable stress range for reducing centrifugal stresses developed therein when the impeller casing rotates at high speeds.

The speed-increasing gear train is provided only on the input shaft, i.e., an input side of the impeller and the runner. The speed-increasing gear train is not provided on an output side of the impeller and the runner. The peripheral speeds of the impeller and the runner are high, and hence they are subject to centrifugal stresses that increase in proportion to the square of the peripheral speeds. If the peripheral speeds of the impeller and the runner exceed a certain limit, the impeller and the runner would be subjected to fracture or fatigue-induced fracture. The peripheral speeds of the impeller and the runner measured at their effective-diameter portions thereof should not exceed a value ranging from about 150 m/s to 165 m/s if the impeller and the runner were made of an alloy steel for use in machine structures.

According to the present invention, the impeller casing which is connected to the impeller in an overhanging and cantilevered fashion, or the impeller casing and the impeller are made of a material having a small specific gravity and a high allowable stress range such as a titanium alloy rather than an alloy steel for use in machine structures. Since the specific gravity of such a material is smaller than an alloy steel for use in machine structures, i.e., 60% of that of an alloy steel for use in machine structures, any centrifugal stresses developed in the impeller and the runner when power is transmitted are reduced. The impeller and the runner are protected from fracture or fatigue-induced fracture even under a combination of such centrifugal stresses, stresses and thermal stresses developed by a centrifugal hydraulic pressure in the working fluid chamber, and stresses caused when torque is transmitted.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
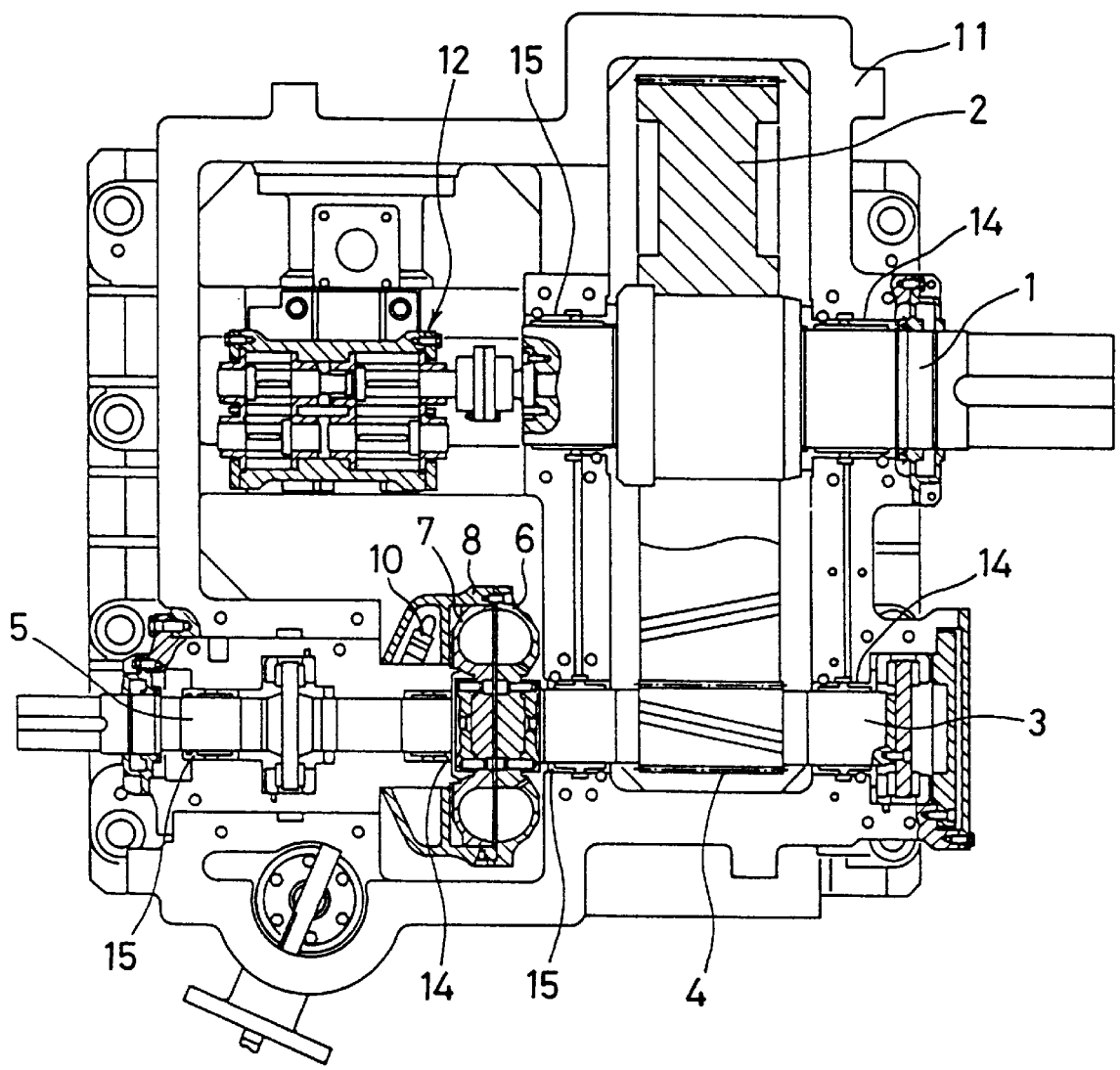
FIG. 1 is an axial cross-sectional view of a fluid coupling according to the present invention.
Figure 2:
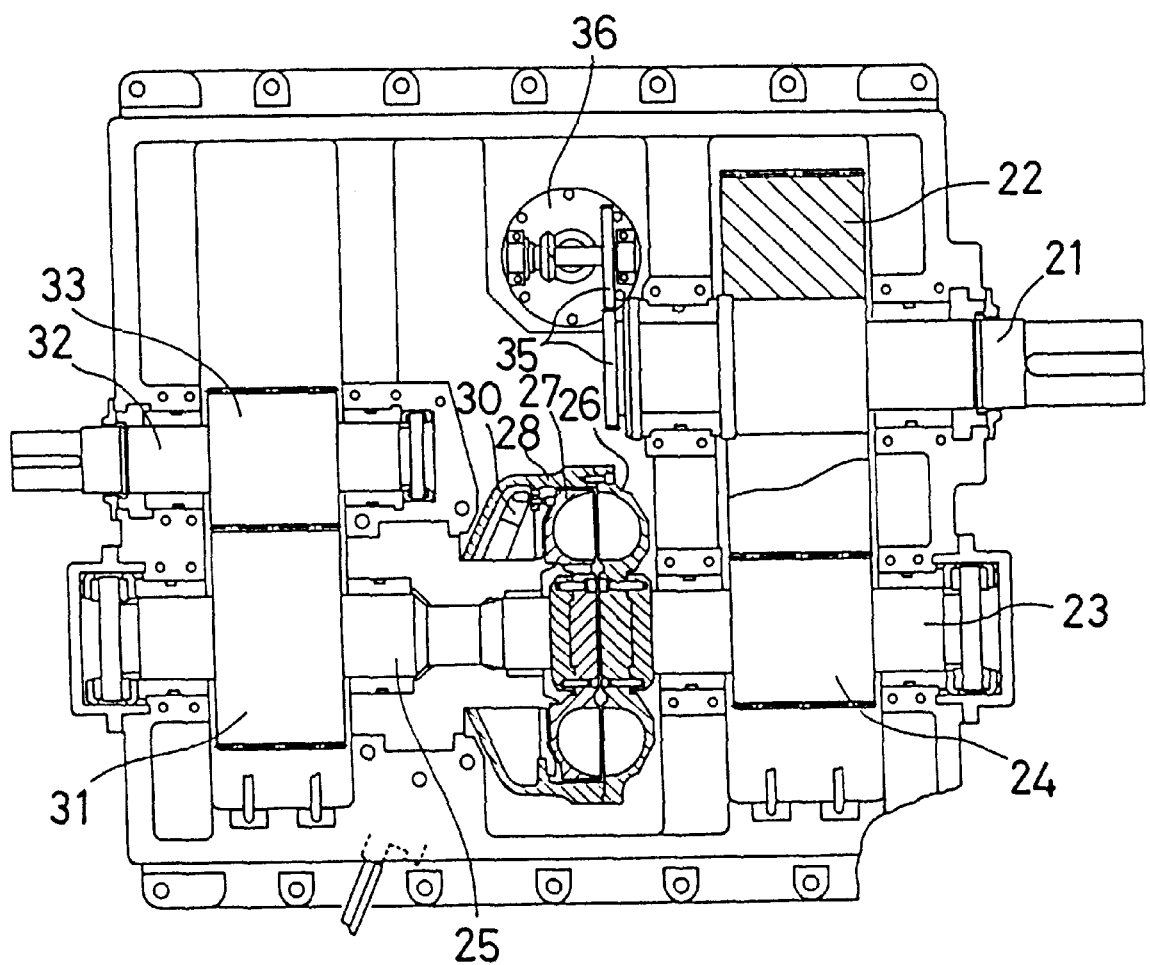
FIG. 2 is an axial cross-sectional view of a conventional fluid coupling.

As shown in FIG.1, a fluid coupling according to the present invention has an input shaft 1 with a large gear 2 mounted thereon, and a drive shaft 3 disposed parallel to the input shaft 1 and supporting a small gear 4 held in mesh with the large gear 2. The large gear 2 and the small gear 4 which are held in mesh with each other jointly serve as a speed-increasing gear train for increasing the rotational speed of the drive shaft 3 as compared with the rotational speed of the input shaft 1. The fluid coupling also has an output shaft 5 disposed adjacent to and coaxially with the drive shaft 3.

An impeller 6 is coupled to an inner end of the drive shaft 3, and a runner 7 is coupled to an inner end of the output shaft 5 and operatively combined with the impeller 6. The impeller 6 is fixed to an impeller casing 8 which houses the runner 7 therein. The impeller 6, the runner 7 and the impeller casing 8 jointly define a working fluid chamber with a scoop tube 10 disposed therein for continuously varying the rotational speed of a load such as a pump coupled to the output shaft 5 from a minimum speed level to a maximum speed level. The speed-increasing gear train, the impeller 6, the runner 7 and the impeller casing 8 are housed in a coupling housing 11.

The impeller casing 8 is made of a material having a small specific gravity and a high allowable stress range, e.g., a titanium alloy or an aluminum alloy. Specifically, the titanium alloy is composed of 5.5 to 6.75 weight % of aluminum (Al), 3.5 to 4.5 weight % of vanadium (V), 0.3 weight % or less of iron (Fe), 0.2 weight % or less of oxygen (O), 0.1 weight % or less of carbon (C), 0.4% or less other elements, and the remainder of titanium (Ti). The aluminum alloy is composed of 5.1 to 6.1 weight % of zinc (Zn), 2.1 to 2.9 weight % of magnesium (Mg), 1.2 to 2.0 weight % of copper (Cu), 0.4 weight % or less of silicon (Si), 0.5 weight % or less of iron (Fe), 0.3 weight % or less of manganese (Mn), 0.25 weight % or less of zirconium (Zr)+titanium (Ti), 0.2 weight % or less of titanium (Ti), and the remainder of aluminum (Al).

The impeller 6 is also made of a material having a small specific gravity and a high allowable stress range, e.g., a titanium alloy or an aluminum alloy. The titanium alloy has the same composition as the titanium alloy of the impeller casing 8.

Auxiliary machines such as a main oil pump 12 and an auxiliary oil pump (not shown) are connected to the input shaft. The auxiliary machines extend in an axial direction of the input shaft 1. Each of the input shaft 1, the drive shaft 3, and the output shaft 5 is rotatably supported in the coupling housing 11 by two static bearings 14, 15.

According to the present invention, the speed-increasing gear train, which comprises the large gear 2 and the small gear 4, is disposed only on an input side of the impeller 6 and the runner 7, and the impeller casing 8 is made of a material having a small specific gravity and a high allowable stress range, e.g., a titanium alloy or an aluminum alloy. Therefore, the impeller 6 and the runner 7 are subjected to reduced centrifugal stresses when they rotate at high speeds in the range of 7,000 to 10,000 rpm. The impeller 6 and the runner 7 are thus protected from fracture under stresses upon rotation at high speeds. Consequently, it is not necessary to install a speed-increasing gear train on an output side of the impeller 6 and the runner 7, and hence shafts and bearings which would otherwise accompany such a speed-increasing gear train, resulting in a reduction in the size of the coupling housing 11. The output shaft 5, which is connected to the output side of the impeller 6 and the runner 7, may therefore be connected to a load such as a pump or other rotary machinery through a coupling.

The auxiliary machines including the main oil pump 12 may be disposed in a space within the coupling housing 11 which would otherwise be taken up heretofore by a speed-increasing gear train on an output side of the impeller and the runner. As a result, the space in the coupling housing 11 can effectively be utilized.

Specific gravity and tensile strength values of a conventional alloy steel for use in machine structures, e.g., SCM440Q, and a titanium alloy, e.g., Ti6Al4V, for use in the impeller casing 8 and the impeller 6 according to the present invention are shown in Table below.

| Material | Specific gravity | Tensile strength (N/mm$^2$) |
|---|---|---|
| SCM440Q JISG4105 chromium molybdenum steel material | 7.8 | 981 or greater |
| Ti6Al4V JISH4607 titanium alloy plate JISH4657 titanium alloy bar and forged product | 4.4 | 825 or greater |

As described above, according to the present invention, the impeller casing connected to the impeller in an overhanging and cantilevered fashion, or both the impeller casing and the impeller are made of a material having a small specific gravity and a high allowable stress range, rather than a conventional alloy steel for use in machine structures. Since the impeller and the runner, which serve as a centrifugal coupling unit, are protected from fracture under stresses when they rotate at high speeds in the range of 7,000 to 10,000 rpm, a speed-increasing gear train may be disposed only on an input side of the impeller and the runner, and no speed-increasing gear train is required on an output side of the impeller and the runner. The space in the coupling housing can effectively be utilized because the auxiliary machines including the main oil pump may be disposed in a space within the coupling housing which would otherwise be taken up heretofore by a speed-increasing gear train on an output side of the impeller and the runner.

The fluid coupling according to the present invention is thus lighter and more compact than the conventional fluid coupling having two speed-increasing gear trains, and hence takes up a less installation space and can be manufactured less expensively.

Although a certain preferred embodiment of the present invention has been shown and described in detail, it should be understood that various changes and modifications may be made therein without departing from the scope of the appended claims.

What is claimed is:

1. A fluid coupling comprising:

an input shaft;

a drive shaft parallelly disposed with respect to said input shaft, said input shaft and said drive shaft containing gears defining a speed increasing gear train;

a working fluid chamber including an impeller fixedly attached to said drive shaft for rotation therewith and an impeller casing fixedly attached to said impeller;

a runner enclosed by said impeller casing and co-operable with said impeller to transmit rotational force;

an output shaft fixedly attached to said runner for rotation therewith and being adapted for connection to a load to be driven by said fluid coupling; and said impeller casing being made of a material having a small specific gravity and a high allowable stress range for reducing centrifugal stresses developed therein when said impeller casing rotates at high speeds in the range of 7,000 RPM to 10,000 RPM.

2. A fluid coupling according to claim 1, wherein said material of said impeller casing comprises one of a titanium alloy or an aluminum alloy.

3. A fluid coupling according to claim 1, wherein said impeller is made of a material having a small specific gravity and a high allowable stress range for reducing centrifugal stresses developed therein when said impeller rotates at high speeds.

4. A fluid coupling according to claim 3, wherein said material of said impeller comprises one of a titanium alloy or an aluminum alloy.

* * * * *